Figure 1:
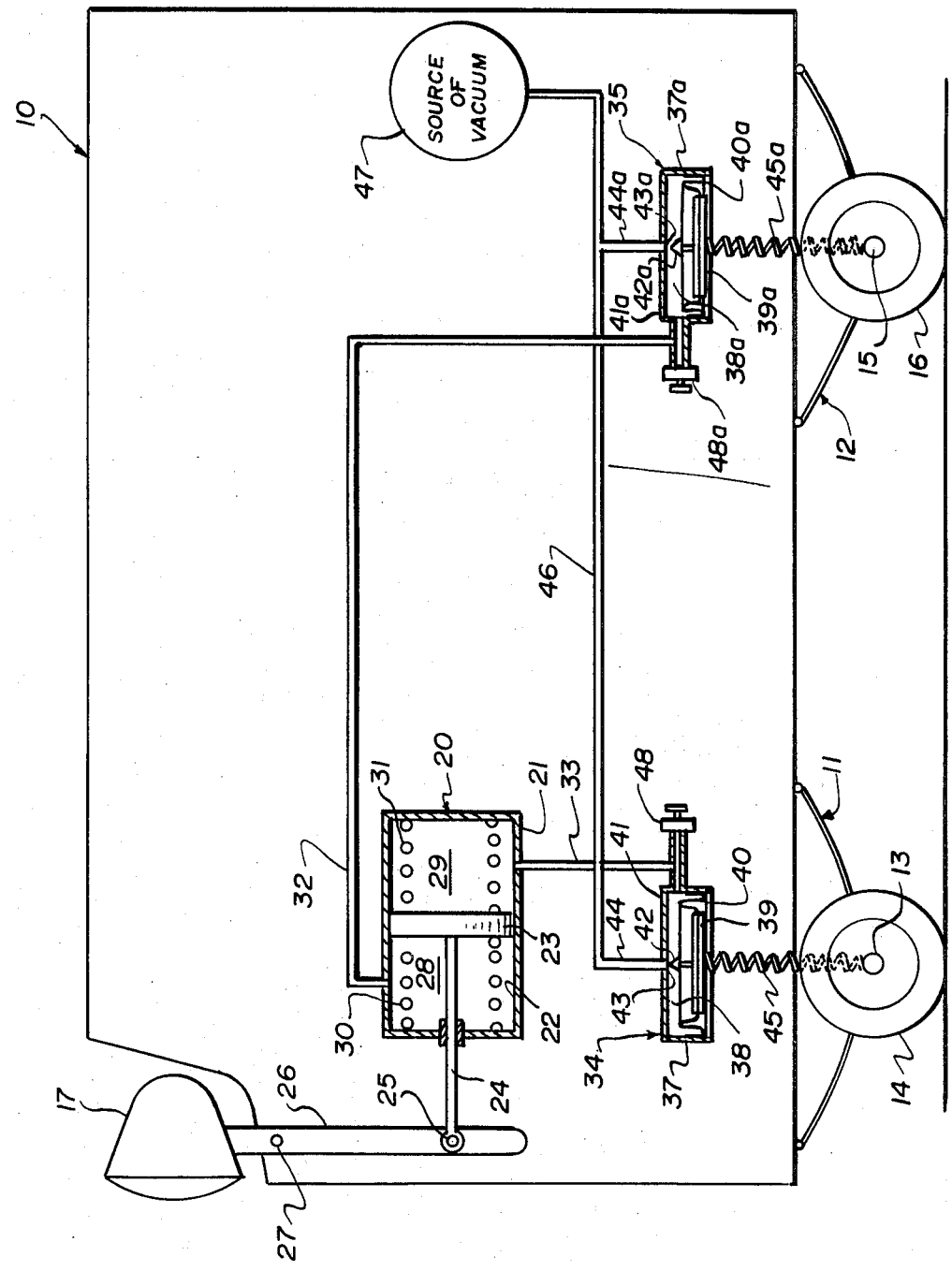

United States Patent [19]
Tuzson

[11] 3,859,516
[45] Jan. 7, 1975

[54] VEHICLE HEADLIGHT ADJUSTING SYSTEM

[75] Inventor: John J. Tuzson, Evanston, Ill.

[73] Assignee: Borg-Warner Corporation, Chicago, Ill.

[22] Filed: Jan. 5, 1973

[21] Appl. No.: 321,487

[52] U.S. Cl. ............................ 240/7.1 LJ, 240/62.3
[51] Int. Cl. ............................................. B60g 1/10
[58] Field of Search ....................... 240/7.1 LJ, 62.3

[56] References Cited
UNITED STATES PATENTS

| | | | |
|---|---|---|---|
| 3,370,162 | 2/1968 | Henry-Biabaud | 240/7.1 LJ |
| 3,402,287 | 9/1968 | Kindman | 240/7.1 LJ |
| 3,453,424 | 7/1969 | Cibie | 240/71. LJ |
| 3,551,668 | 12/1970 | Rivolier | 240/7.1 LJ |
| 3,603,785 | 9/1971 | Baker | 240/62.3 |
| 3,643,082 | 2/1972 | Fleury | 240/7.1 LJ |
| 3,707,623 | 12/1972 | Rivolier | 240/7.1 LJ |
| 3,784,810 | 1/1974 | Andres et al. | 240/7.1 LJ |
| 3,790,771 | 2/1974 | Tixier | 240/7.1 LJ |

FOREIGN PATENTS OR APPLICATIONS

| | | | |
|---|---|---|---|
| 33,967 | 10/1928 | France | 240/62.3 |
| 1,506,590 | 11/1967 | France | 240/62.3 |

Primary Examiner—Samuel S. Matthews
Assistant Examiner—Russell E. Adams, Jr.
Attorney, Agent, or Firm—Herman E. Smith

[57] ABSTRACT

A vehicle headlight adjusting system comprising movable headlights having actuators connected to a piston of a pneumatically operated device, springs in the device for normally centering the piston to maintain the headlights in a predetermined position when the vehicle is level, the piston being movable by variations in air pressure, produced by sensors responding to deflections of the vehicle's front and/or rear wheel suspensions, to move the actuators to adjust the position of the headlights to compensate for vehicle pitch.

4 Claims, 3 Drawing Figures

VEHICLE HEADLIGHT ADJUSTING SYSTEM

BACKGROUND AND SUMMARY OF THE INVENTION

This invention relates to a vehicle headlight adjusting system to compensate for vehicle pitch and load variations.

Conventional headlights of automotive vehicles are fixedly mounted on the vehicle body which is resiliently supported on the vehicle wheels. Under ideal conditions, the light beams remain correctly directed to provide adequate illumination of the road. However, when the load on the vehicle body is disposed at different locations or positions, an end of the vehicle may be forced downwardly and produce tilting of the light beams at an upward angle dangerous to the drivers of oncoming vehicles since their vision is greatly impaired by the dazzling glare, or at a downward angle to the vehicle operator to his detriment of the area illuminated by the beams.

Various systems have been proposed to rotate or tilt the headlights to automatically provide for their adjustment to changing load and road conditions, including systems for sensing the deflection of both the front and rear suspensions and the differences in the deflections to control the angular tilting of the headlights. Generally, these systems employ mechanically operated actuating apparatus, such as cables, rods, or wires, or static fluid arrangements employing liquid or gas, or electrically operated actuating means, actuated by the vehicle motion itself and necessarily responding to every deflection of the suspension almost instantaneously, with all components constantly subjected to the force and the motion which is required to tiltably position the headlights. It is important to delay the resultant tilting of the headlights in order to avoid immediate tilting of the headlights so that relative movement of the sprung and unsprung parts of the vehicle, due to road irregularities, bumps, or the like, can take place without causing tilting of the headlights. While systems have been proposed to provide for delaying tilting of the headlights, many of these systems are unsatisfactory due to their reliance on unstable physical factors, such as sensitivity to temperature and pressure differences, gravity, or fluid leakage problems.

The present invention proposes to solve this problem by providing a headlight adjusting system in which the headlights are automatically tilted by actuators connected to the piston in a cylinder of a pneumatically operated device, springs in the cylinder engaging the piston for centering the piston to normally maintain the headlights in adjustment, the piston being movable by variations in air pressure, produced by sensors responsive to deflections of the front or rear wheel suspensions, or both, to move the actuators to adjust the headlights to compensate for vehicle pitch.

It is therefore the principal object of this invention to provide an improved vehicle headlight adjusting system operative to detect changes in the spacing between the vehicle body and the front and rear wheels thereof and to tilt the headlights relative to the body in response to the differential change between the body and each of the front and rear wheels thereof to maintain the headlights in a preselected angular relationship with respect to the road surface.

Another object of the invention is to provide an improved vehicle headlight adjusting system operative to tilt the headlights to automatically provide for their adjustment to changing load and road conditions, including sensing the deflection and relative movement of sprung and unsprung portions of the vehicle, in a manner to provide a suitable time delay prior to headlight adjustment.

Figure 2:
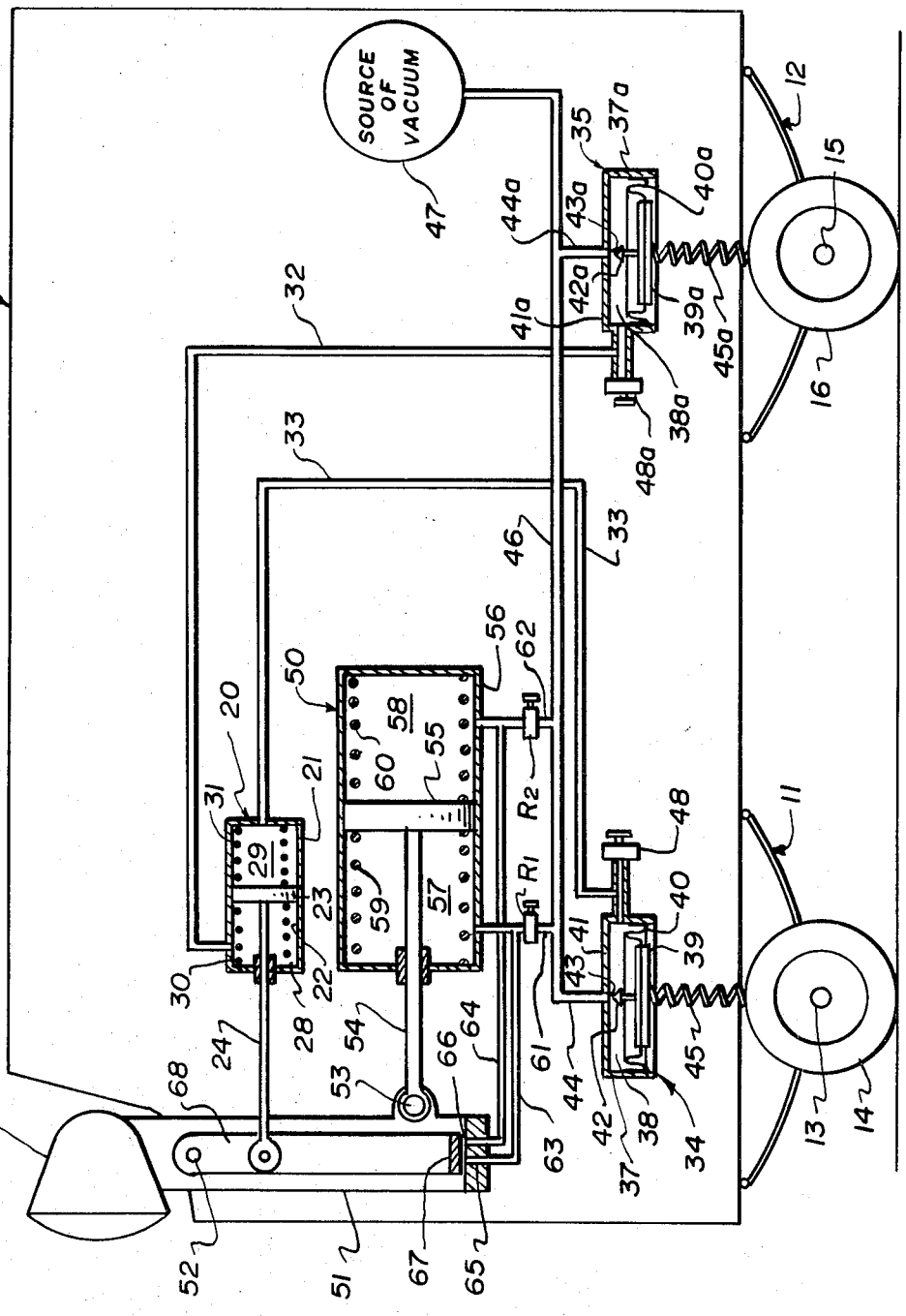
Figure 3:
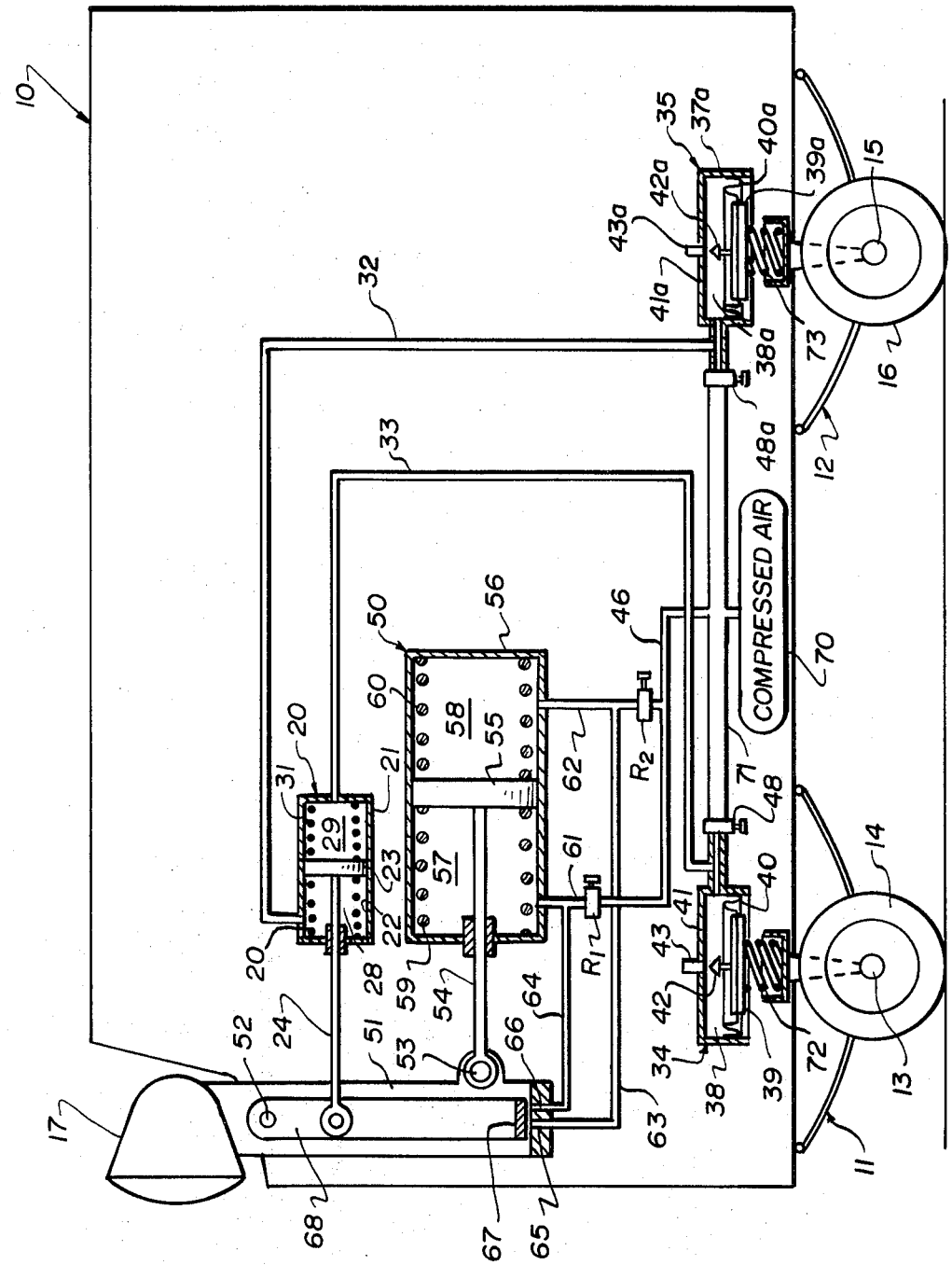

Other and further objects, features and advantages will be apparent from the following description of presently preferred embodiments of the invention, given for the purpose of disclosure, and taken in conjunction with the accompanying drawings, in which FIG. 1 schematically illustrates the improved vehicle headlight adjusting system embodying the invention;

FIG. 2 schematically illustrates an alternative form of the embodiment of the system of FIG. 1; and FIG. 3 schematically illustrates another alternative form of the embodiment of the system of FIG. 1.

Referring to FIG. 1, reference numeral 10 denotes the body of a motor vehicle supported by springs 11 and 12 connected to the body, the spring 11 also being connected to the axle 13 of the vehicle rotatably mounting the front wheel 14, and the spring 12 being connected to the axle 15 of the vehicle mounting the rear wheel 16. The body 10 of the vehicle carries the headlight 17.

The improved headlight adjusting system is designed to compensate for angular changes in position of the vehicle body, caused by load and road conditions, in order to automatically maintain the headlights' beams in a preselected angular position level to the road traversed by the vehicle. For this purpose, the system comprises an actuator 20 in the form of a cylinder 21 mounted on the vehicle body 10 in any convenient manner and having a bore 22 in which a piston 23 is slidably disposed. A piston rod 24 has one end connected to the piston 23 and has its other end projecting outwardly of the cylinder and pivotally connected at 25 to the lower end of a lever 26. The lever 26 is pivotally mounted at 27 on the vehicle body and has its upper end secured to the headlight 17. The piston is positioned intermediate and equidistantly from the ends of the cylinder and defines working chambers 28 and 29 in the cylinder. The piston is held in this position by springs 30,31 engaging opposite sides of the piston and the cylinder walls. Thus the headlight is biased by spring means to a position when the mean axis of the light beam, emitted by the headlight, is in the position as would be required under substantially no loading or minimum loading conditions of the vehicle.

Movement of the piston in the cylinder from its centered position shown, will cause the lever 26 to rotate to move the headlight 17, and simultaneously, its companion headlight (not shown) through its connection to headlight 17, relative to the vehicle and to tilt the headlights vertically to thereby raise or lower the light beams emitted by the headlights in relation to the road. Movement of the piston to the right will rotate the lever 26 and headlight 17 in a counterclockwise direction to move the headlight downwardly, and conversely, piston movement to the left will rotate lever 26 and headlight 17 in a clockwise direction to move the headlight upwardly. This piston movement is accomplished pneumatically by the application of vacuum force through conduits 32 and 33 to one or the other of the cylinder chambers 28 or 29 by a control arrangement responsive to changes in spacing of the front and/or rear wheels relative to the body of the vehicle. More particularly, the control arrangement comprises control devices 34 and 35 associated with the vehicle body chassis 10 and respectively with the front and rear wheels 14 and 16. The control device 34 is effective to sense the deflection or displacement of the body 10 relative to the front wheels 14, and the control device 35 senses the deflection or displacement of the body 10 relative to the rear wheels 16. Since both devices 34 and 35 are identical, it is believed a description of the device 34 will suffice to an understanding of the structure and operation of both; components of the device 35, similar to the device 34, being indicated by the suffix a appended to the same numerals identifying like components in both devices.

The control device 34 comprises a deflection sensor including a container cylinder 37, fixed to the vehicle body frame, providing a diaphragm chamber 38, and a diaphragm piston 39 connected to the cylinder by a flexible web 40, for movement in the chamber relative to the end wall 41 of the cylinder, the web being secured to the rim of the cylinder and in a manner to prevent the passage of air between the web and the cylinder rim into the chamber. A poppet 42 is fixed to the piston 39 and is movable with the piston to engage and disengage an annular seat 43 provided by the end of a tubular conduit 44 located centrally of, and fixed to, the end wall 41 of the cylinder. An extension or tension spring 45 has one end anchored to the axle 13 and its other end secured to the piston 39 to move the piston in a downward direction and thereby to retract the poppet 42 from the seat 43. The conduit 44 is connected to a conduit 46 in communication with a source of vacuum 47, which may be the vehicle engine, operative to draw the piston 39 toward the end wall 41 and thereby the poppet 42 into engagement with the seat 43. The conduit 33 is connected to the chamber 38 and chamber 29 so that vacuum will be operative to cause movement of the piston 23 to the right to rotate the lever 26. Conduit 32 connects chamber 38a to the chamber 28 to provide vacuum to the chamber 28 to move piston 23 to the left to rotate the lever 26.

It will be apparent that the force of the tension spring 45 of the control device 34 will vary with the deflection of the front suspension, and the force of the tension spring 45a of the control device 35 will vary with the deflection of the rear suspension. In each control device, the tension spring force is counteracted by the force of vacuum of the diaphragm piston, which is selfregulating and varies with the deflection. For example, if the deflection increases, the tension spring force decreases, the poppet seats and closes the conduit to the vacuum supply. The device 34 is provided with a bleed orifice 48, and the device 35 has a bleed orifice 48a. In each device, atmospheric pressure can bleed, via its orifice, into the diaphragm chamber, until the vacuum in the chamber is reduced to a point where the tension spring force can lift the poppet off its seat and reestablish the connection with the source of vacuum. Accordingly, the vacuum in the diaphragm chamber is related to the deflection of the suspension.

Since the vacuum signals from the front suspension and from the rear suspension are connected, via the devices 34 and 35 and conduits 32 and 33, to opposite sides of the double-acting, spring-centered actuator 20, then the stroke of the actuator piston 23 will vary in proportion to the difference of the front and rear suspension deflections. As the piston is connected to the headlight-pivoting lever 26, the described headlight adjusting system will automatically operate to maintain the headlight beams in proper position relative to the road and regardless of the angular tilt of the vehicle caused by load and road conditions.

The embodiment of the invention illustrated in FIG. 2 is an improvement of the headlight adjusting system of FIG. 1, like parts being similarly identified numerically in the views. As in FIG. 1, FIG. 2 also discloses a motor vehicle having a body 10 suspended on springs 11 and 12 connected thereto and the axles 13, 15 carry road wheels 14 and 16.

As in the system of FIG. 1, the control devices 34 and 35 control movement of the double-acting, spring-centered piston 23 in the cylinder 21 in response to vacuum signals from the front and rear suspensions, the stroke of the piston varying in proportion to the difference of the front and rear suspension deflections. The improvement disclosed in FIG. 2, is designed to provide a modified headlight-leveling system further assuring delay in tilting the headlights to avoid undesired instantaneous tilting in response to every deflection of the front and rear spring suspensions, as well as to provide for positive movement of the headlight-moving linkages by overcoming any sticking and friction in the linkages in operation. For this purpose, the system contemplates the provision of a "master and slave" type, pneumatically operated, actuating mechanism in which the "master" actuator 20 controls the movement of the "slave" actuator 50 connected to the headlight-tilting lever 51. The headlight 17 is secured to the upper end of lever 51, and the lever is pivoted on a pin 52 connected to the vehicle body to rotate the headlight. The lever 51 has its lower end pivotally connected at 53 to the piston rod 54 of the slave actuator 50. The actuator 50 has a piston 55 secured to the rod 54, and a cylinder 56 mounted on the vehicle body and supporting the piston 55 for reciprocal movement. The piston 55 is positioned intermediate and equidistantly from the ends of the cylinder 56 and defines working chambers 57 and 58 in the cylinder. Springs 59 and 60 engage opposite sides of the piston and the cylinder end walls and are operative to center the piston in the cylinder. The cylinder chambers 57 and 58 are respectively connected by conduits 61 and 62 to the vacuum conduit 46 in a manner to equialize the vacuum force on the piston 55 to that the springs 59 and 60 center the piston in the cylinder 56. The conduit 61 is provided with a restriction R1 and the conduit 62 is provided with a restriction R2. To effect tilting movement of the headlights in response to deflections of the spring suspensions, a flexible conduit 63 is connected through conduit 61 to the chamber 57 of cylinder 56 and is also connected through restriction R1 and conduit 61 to the vacuum conduit 46, and a flexible conduit 64 is connected through conduit 62 to the chamber 58 of the cylinder 56 and is also connected through restriction R2 and conduit 62 to the vacuum conduit 46, the conduits 63 and 64 terminating in bleed orifices 65 and 66 in the lower end of lever 51 and which can communicate with atmospheric pressure, the orifices being covered selectively or simultaneously by a control portion 67 of a lever 68 pivotally connected to the pin 52 for movement relative to the lever 51. The lever 68 is connected to the piston rod 24 and, accordingly, is operable in response to movement of the piston 23 of actuator 20.

In operation, the control devices 34 and 35 are responsive to deflections of the front and rear spring suspensions and influence the force of vacuum on the master actuator 20 to move the lever 68 about the pin 52 in the same manner as previously explained in the description of the system shown in FIG. 1. Displacement of the lever 68 uncovers one or the other of the bleed orifices 65,66 in the lever 51 and which lead to one or the other side of the double-acting power actuator piston 55, both sides of which have been evacuated through restrictions 61,62 connected to the source of vacuum 47. Since a small motion of the control lever 68 is sufficient to vent one side of the actuator 50, full vacuum force is available to move the headlight lever 51 until it moves to the position of the control lever 68, at which time the bleed orifice is again obstructed. An important feature is the active resistance of the slave actuator 50 to any external effort to move the headlights.

As shown in FIG. 3, the headlight leveling system may be powered by compressed air instead of vacuum as contemplated in FIGS. 1 and 2. It may be noted substantially all of the components of the system of FIGS. 2 and 3 are similar as identified numerically in the respective views. However, since compressed air is employed as the motivating power, a source of compressed air 70, such as a compressor (not shown) operated by the vehicle engine, is indicated. The FIG. 3 system also differs from the FIG. 2 system by the front and rear spring deflection sensor devices 34, 35 being connected to the source 70 of compressed air by a conduit 71 and bleed ports 48 and 48a; conduits 43 and 43a being open to atmosphere; the control devices 34 and 35 being operative to control compressed air to the conduits 32 and 33 and thereby to the chambers 28 and 29 of the master actuator 20 to move its piston 23 and control lever 68 to open one or the other of the orifices 65 and 66 to bleed compressed air, via conduits 63 and 64 to the atmosphere; conduit 46 being connected to provide for flow of air under pressure from the compressed air source 70 to the conduits 61 and 62, and through restrictions R1 and R2 therein, to the chambers 57 and 58 to move the piston 55 of the slave actuator 50 to pivot the headlight tilting lever 51; and the system utilizing compression springs 72 and 73 between the axles 13 and 15 and the control devices 34 and 35 to resist movement of the diaphragms 38 and 39a by the compressed air in the chambers 38 and 38a of the control devices.

In the operation of the system shown in FIG. 3, assuming the vehicle is at rest under no load conditions, or traveling with the headlights in their preselected angular relationship to the road surface, the pistons 23 and 55 will be centered in the cylinders 21 and 56 of the master and slave actuators by their engaging springs and also balanced by the compressed air in the chambers 28 and 29 in cylinder 21 and chambers 57 and 58 in cylinder 56. When a change in the angular relationship of the vehicle body with respect to the road surface occurs, there will be a differential change in the spacing between the body and each of the front and rear wheels of the vehicle. Upon this occurrence, the front deflection sensor or control device 34 and the rear deflection sensor or control device 35 will function to cause the force of the springs 72 and 73 to vary with the deflection of the suspensions and operate the diaphragm pistons 39 and 39a to open one of the ports 43 and 43a while closing the other of the ports to provide a build-up of compressed air on one or the other of the chambers 28 or 29 of the cylinder 21 to thereby effect movement of the piston 23 and thereby the lever 68 to have its control portion 67 uncover one of the bleed ports 65 or 66 to provide an imbalance of compressed air in the chambers 57 or 58 effective to move the piston 55 and lever 51 to tilt the headlights 17 to maintain the headlights in a preselected angular relationship with respect to the road surface.

It will be apparent that each of the disclosed specific embodiments of the invention provide systems in which the headlights are normally maintained in adjustment by a normally balanced spring arrangement provided by a pair of opposed springs, and means sensing any deflection or displacement of the vehicle's front and/or rear wheel suspensions causing operation of a flowing pneumatic circuit to adjust the headlights. The described headlight adjusting systems are relatively insensitive to temperature and pressure differences as a result of the balanced forces on the actuator piston, and it is relatively insensitive to minor leakage since the systems operate on the principle of a constantly bleeding circuit.

While this invention has been described in connection with specific embodiments thereof, it is to be understood that this is by way of illustration and not by way of limitation; and the scope of the appended claims should be construed as broadly as the prior art will permit.

What is claimed is:

1. A system for automatically adjusting the inclination of the headlights of an automotive vehicle having a body resiliently suspended for deflection relative to front and rear wheel assemblies thereof, comprising:
   a fluid circuit including a pneumatic source providing a pressure differential with respect to ambient atmosphere, and a pair of branch circuits each including a bleed orifice communicating continuously with ambient atmosphere and a poppet valve controlling flow between said source and a respective branch circuit,
   a pair of control devices connected to said front and rear wheel assemblies respectively for sensing the relative deflection of said body with respect thereto, each of said control devices being connected to one of said poppet valves biasing said valve proportional to the deflection of its associated wheel assembly providing a regulated pressure in its associated branch circuit proportional to the deflection of its associated wheel assembly,
   each of said branch circuits being connected to one of a pair of opposed variable volume working chambers forming a double acting fluid motor, said fluid motor being connected to adjusting means for tilting said headlights about a horizontal axis and operable to correct the inclination of said headlights proportional to the difference in deflection of said front and rear wheel assemblies.

2. A system for automatically adjusting the inclination of the headlights of an automotive vehicle having a body resiliently suspended for deflection relative to front and rear wheel assemblies thereof, comprising:
   a fluid circuit including a pneumatic source providing a pressure differential with respect to ambient atmosphere, and a pair of branch circuits each including a vent port communicating with ambient atmosphere, each of said branch circuits being connected to one of a pair of opposed variable volume working chambers forming a double acting fluid motor;

movable flow control means cooperating with the vent ports of said branch circuits operable for regulating fluid pressure in the working chambers of said fluid motor;

a pair of control devices connected to said front and rear wheel assemblies respectively for sensing the relative deflection of said body with respect thereto, each control device being connected to a respective one of a pair of poppet valves biasing said valve proportional to the deflection of its associated wheel assembly, each of said poppet valves being connected between said pneumatic source and a respective leg of a servo circuit providing a reference pressure therein proportional to the deflection of its associated wheel assembly, respective legs of said servo circuit being connected to a servo motor operatively connected to said flow control means, said fluid motor being connected to adjusting means for tilting said headlights about a horizontal axis and operable in response to unequal pressures in said working chambers to change the inclination of said headlights, pressure changes in said working chambers being controlled by said flow control means whereby the change in inclination of said headlights is proportional to the difference in deflection of said front and rear wheel assemblies.

3. A system for automatically adjusting the inclination of the headlights of an automotive vehicle according to claim 2, each of said control devices including a pressure regulating chamber having a movable diaphragm defining one wall thereof, said diaphragm being connected to its respective wheel assembly by spring means exerting a biasing force thereon proportional to deflection of the associated wheel assembly, said diaphragm chamber communicating with a respective leg of said servo circuit and with a bleed orifice, said poppet valve being connected to said diaphragm for movement therewith controlling flow between said diaphragm chamber and said pneumatic source, whereby the reference pressure in said diaphragm chamber is regulated in proportion to the biasing force resulting from deflection of said wheel assembly.

4. A system for automatically adjusting the inclination of the headlights of an automative vehicle according to claim 2, each of said control devices including a pressure regulating chamber having a movable diaphragm defining one wall thereof, said diaphragm being connected to its respective wheel assembly by spring means exerting a biasing force thereon proportional to deflection of the associated wheel assembly, said diaphragm chamber communicating with a respective leg of said servo circuit and with said pneumatic source, said poppet valve being connected to said diaphragm for movement therewith controlling flow between said diaphragm chamber and ambient atmosphere, whereby the reference pressure in said diaphragm chamber is regulated in proportion to the biasing force resulting from deflection of said wheel assembly.

* * * * *